(12) United States Patent
Chiu

(10) Patent No.: US 12,105,622 B2
(45) Date of Patent: Oct. 1, 2024

(54) METHOD AND NON-TRANSITORY COMPUTER-READABLE STORAGE MEDIUM AND APPARATUS FOR DATA ACCESS IN RESPONSE TO HOST DISCARD COMMANDS

(71) Applicant: Silicon Motion, Inc., Zhubei (TW)

(72) Inventor: Shen-Ting Chiu, Miaoli County (TW)

(73) Assignee: SILICON MOTION, INC., Zhubei (TW)

( * ) Notice: Subject to any disclaimer, the term of this patent is extended or adjusted under 35 U.S.C. 154(b) by 113 days.

(21) Appl. No.: 18/110,747

(22) Filed: Feb. 16, 2023

(65) Prior Publication Data
US 2023/0315622 A1 Oct. 5, 2023

(30) Foreign Application Priority Data
Mar. 31, 2022 (CN) .......................... 202210335258.1

(51) Int. Cl.
*G06F 12/02* (2006.01)
*G06F 13/16* (2006.01)

(52) U.S. Cl.
CPC ...... *G06F 12/0246* (2013.01); *G06F 12/0292* (2013.01); *G06F 13/1668* (2013.01)

(58) Field of Classification Search
CPC ............. G06F 12/0246; G06F 12/0292; G06F 3/0652; G06F 3/0653; G06F 3/0604; G06F 13/1668; G06F 2212/7201; G06F 2212/7204; G06F 2212/7205; G06F 2212/7209
See application file for complete search history.

(56) References Cited

U.S. PATENT DOCUMENTS

| | | | |
|---|---|---|---|
| 9,558,112 B1* | 1/2017 | Borchers | G06F 12/0253 |
| 2004/0181627 A1 | 9/2004 | Lin et al. | |
| 2012/0246388 A1 | 9/2012 | Hashimoto | |
| 2013/0275660 A1 | 10/2013 | Bennett | |
| 2014/0258601 A1 | 9/2014 | Ware et al. | |
| 2018/0188998 A1* | 7/2018 | Shaharabany | G06F 3/0688 |
| 2019/0155764 A1 | 5/2019 | Lo et al. | |
| 2019/0171559 A1* | 6/2019 | Lee | G06F 12/0246 |
| 2020/0026436 A1* | 1/2020 | Ou | G06F 3/0611 |
| 2021/0232499 A1* | 7/2021 | Yong | G06F 12/0246 |

FOREIGN PATENT DOCUMENTS

| | | |
|---|---|---|
| TW | 200417855 A | 9/2004 |
| TW | 201923601 A | 6/2019 |

* cited by examiner

*Primary Examiner* — Tracy C Chan
(74) *Attorney, Agent, or Firm* — Birch, Stewart, Kolasch & Birch, LLP

(57) ABSTRACT

The invention relates to a method, a non-transitory computer-readable storage medium and an apparatus for data access in response to a host discard command. The method includes: allocating space in a random access memory (RAM) for an expanded discard table; receiving the host discard command from a host side; appending new entries each including one first logical address to the expanded discard table; and setting a start-address register and/or an end-address register in a performance engine for redefining an address range in the RAM that stores the expanded discard table, thereby enabling the performance engine to search the expanded discard table in the address range in the RAM for determining whether a specific logical address of user data is no longer used.

20 Claims, 9 Drawing Sheets

METHOD AND NON-TRANSITORY COMPUTER-READABLE STORAGE MEDIUM AND APPARATUS FOR DATA ACCESS IN RESPONSE TO HOST DISCARD COMMANDS

CROSS-REFERENCE TO RELATED APPLICATIONS

This application claims the benefit of priority to Patent Application No. 202210335258.1, filed in China on Mar. 31, 2022; the entirety of which is incorporated herein by reference for all purposes.

BACKGROUND

The disclosure generally relates to storage devices and, more particularly, to a method, a non-transitory computer-readable storage medium and an apparatus for data access in response to host discard commands.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. It is desirable to have a method, a non-transitory computer-readable storage medium and an apparatus for data access in response to discard commands to enhance the execution performance of the flash controller.

SUMMARY

In an aspect of the invention, an embodiment introduces a method for data access in response to discard commands to include: allocating space in a random access memory (RAM) for an expanded discard table; receiving the host discard command from a host side; appending new entries each including one first logical address to the expanded discard table; and setting a start-address register and/or an end-address register in a performance engine for redefining an address range in the RAM that stores the expanded discard table, thereby enabling the performance engine to search the expanded discard table in the address range in the RAM for determining whether a specific logical address of user data is no longer used.

In another aspect of the invention, an embodiment introduces a non-transitory computer-readable storage medium for data access in response to discard commands to include computer program code when being executed by a processing unit to realize the above method.

In still another aspect of the invention, an embodiment introduces an apparatus for data access in response to discard commands to include: a RAM; a performance engine; and a processing unit. The RAM is arranged operably to allocate space for an expanded discard table. The performance engine includes a start-address register and an end-address register for defining an address rang in the RAM storing the expanded discard table. The processing unit is arranged operably to: receive a first host discard command from a host side, wherein the first host discard command indicates first logical addresses of user data that is no longer used; append first new entries each comprising one first logical address to the expanded discard table; and set the start-address register and/or the end-address register in the performance engine for redefining the address range in the RAM that stores the expanded discard table, thereby enabling the performance engine to search the expanded discard table in the address range in the RAM for determining whether a specific logical address of user data is no longer used.

The expanded discard table includes multiple entries and each entry records one logical address of discarded user data. The host discard command indicates logical addresses of user data that is no longer used.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
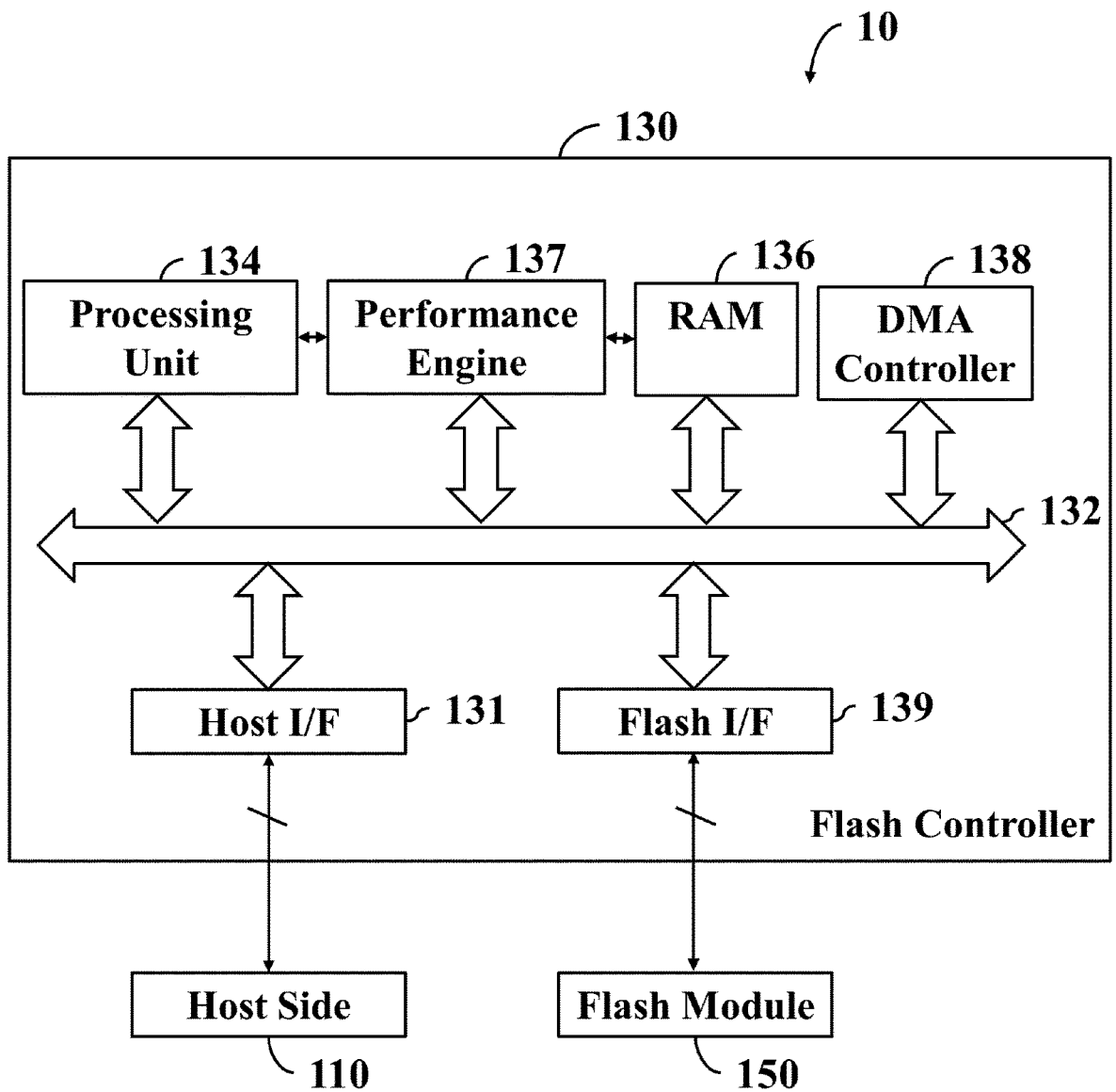
FIG. 1 is the system architecture of an electronic apparatus according to an embodiment of the invention.

Refer to FIG. 1. The electronic apparatus 10 includes the host side 110, the flash controller 130 and the flash module 150. The flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, a smart television, a smart refrigerator, a smart range hood, an automotive electronics system, or other consumer electronic products. The host side 110 and the host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors, or graphics processing units capable of parallel computations, or others) that is programmed using firmware and/or software instructions to perform the functions recited herein. The processing unit 134 receives host commands, such as host read, write, trim, discard, erase commands etc., through the host I/F 131, schedules and executes these commands. The flash controller 130 includes a Random Access Memory (RAM) 136 and the RAM 136 may be implemented in a Dynamic Random Access Memory (DRAM), a Static Random Access Memory (SRAM), or the combination thereof, for allocating space as a data buffer storing user data (also referred to as host data) that is to be programmed into the flash module 150, and has been read from the flash module 150 and is to be output to the host side 110. The RAM 136 stores necessary data in execution, such as variables, data tables, data abstracts, host-to-flash address mapping (referred to as H2F in brief) tables, flash-to-host address mapping (referred to as F2H in brief) tables, and so on. The flash I/F 139 includes a NAND flash controller (NFC) to provide functions that are required to access to the flash module 150, such as a command sequencer, a Low Density Parity Check (LDPC) encoder/decoder, etc.

In some embodiments, the processing unit 134 may receive a discard command from the host side 110 through the host I/F 131 in compliance with an eMMC specification, such as Section 6.6.12 of *EMBEDDED MULTI-MEDIA CARD (e•MMC), ELECTRICAL STANDARD* (5.1), published in January 2019. In alternative embodiments, the processing unit 134 may receive a UNMAP command from the host side 110 through the host I/F in compliance with a UFS specification, such as the Section 11.3.26 of *UNIVERSAL FLASH STORAGE (UFS), Version* 3.1, published in January 2020. The UNMAP command whose the parameter "bProvisioningType" of the unit descriptor set to "02h" represents a discard command. The host side 110 may issue the aforementioned host discard command to the flash controller 130 to indicate the logical addresses of the unused user data, which are represented by host page numbers, logical block addresses (LBAs) or other means. Different from the host erase commands, the flash controller 130 when executing the host discard commands does not need to physically erase the memory cells storing the data of the indicated logical addresses, but only needs to mark the data of the indicated logical addresses no longer exist. When appropriate, the flash controller 130 performs a garbage collection (GC) procedure to gather and erase the physical memory cells corresponding to the marked logical addresses.

The bus architecture 132 may be configured in the flash controller 130 for coupling between components to transfer data, addresses, control signals, etc., which include the host I/F 131, the processing unit 134, the RAM 136, the performance engine 137, the direct memory access (DMA) controller 138, the flash I/F 139, and so on. In some embodiments, the host I/F 131, the processing unit 134, the RAM 136, the DMA controller 138, the flash I/F 139 are coupled to each other by a single bus. In alternative embodiments, a high-speed bus is configured in the flash controller for coupling the processing unit 134, the performance engine 137, the DMA controller 138 and the RAM 136 to each other and a low-speed bus is configured for coupling the processing unit 134, the DMA controller 138, the host I/F 131 and the flash I/F 139 to each other. The DMA controller 138 may move data between the components through the bus architecture according to instructions issued by the processing unit 134, for example, moving data in a specific data buffer of the host I/F 131 or the flash I/F 139 to a specific address of the RAM 136, moving data in a specific address of the RAM 136 to a specific data buffer of the host I/F 131 or the flash I/F 139, or others.

The bus includes a set of parallel physical-wires connected to two or more components of the flash controller 130. The bus is a shared transmission medium so that only two devices can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash module 150 provides huge storage space typically in hundred Gigabytes (GB), or even several Terabytes (TB), for storing a wide range of user data, such as high-resolution images, video files, etc. The flash module 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals run on physical wires including data lines, a clock signal line and control signal lines for coordinating the command, address and data transfer with the flash module 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
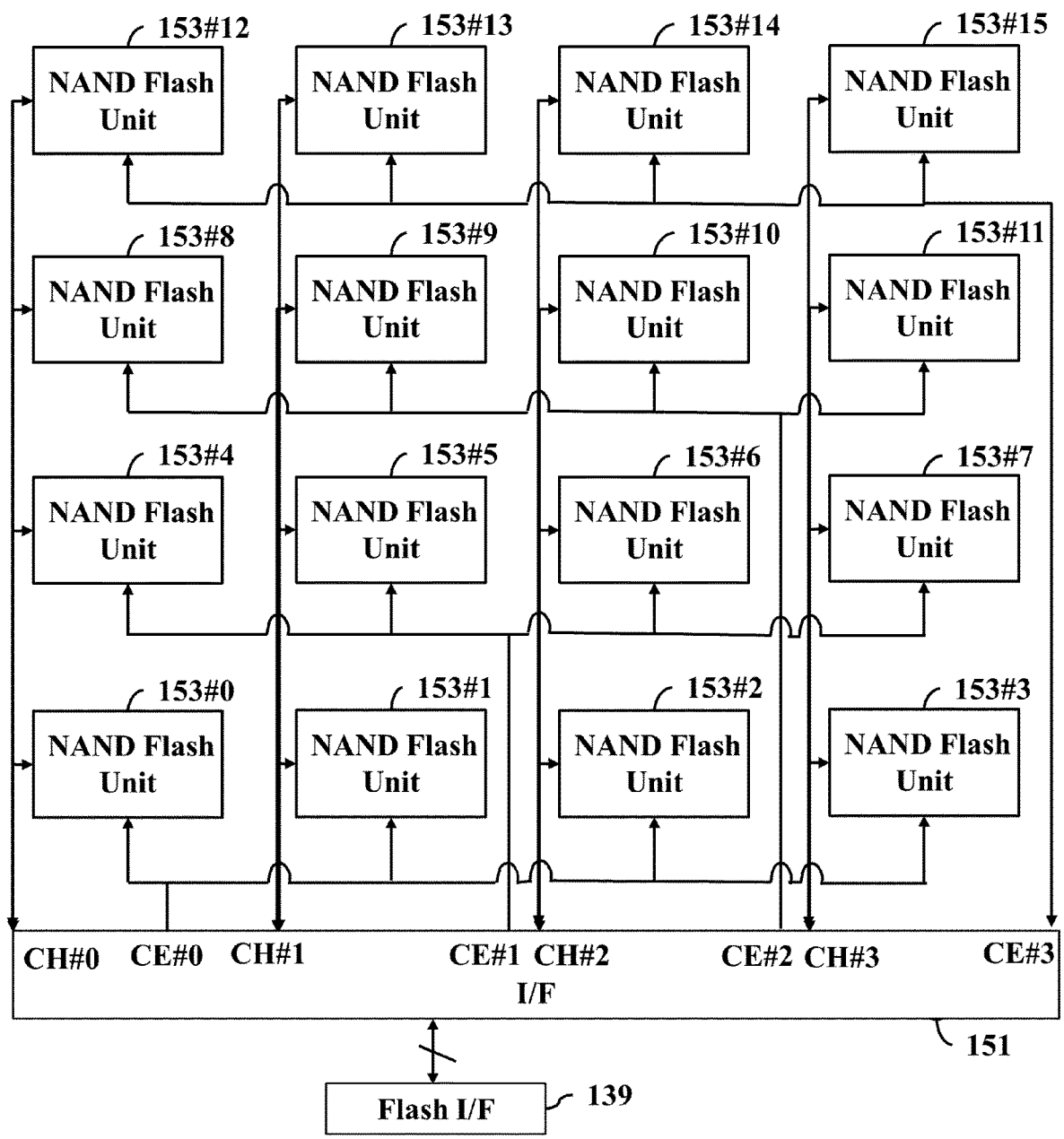
FIG. 2 is a schematic diagram illustrating a flash module according to an embodiment of the invention.

Refer to FIG. 2. The flash I/F 151 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

In some previous implementations, the flash controller 130 may allocate space in the RAM 136 for a discard queue. The discard queue includes multiple nodes and each node is used to store information about a logical address range of discarded user data indicated by one host discard command. Table 1 shows an exemplary discard queue:

TABLE 1

| Node# | Start Address | Length |
|---|---|---|
| 0 | P#100 | 32 |
| 1 | P#200 | 4 |
| 2 | P#300 | 64 |
| 3 | P#500 | 8 |

For example, each node stores a start host-page number and a length indicated by one host discard command. The above described node #0 to node #3 contains the following information: The previously received four discard commands instruct to discard the user data of host pages P #100~P #131, P #200~P #203, P #300~P #363 and P #500~P #507, respectively. However, the processing unit 134 consumes computation resources to search the discard queue for determining whether the user data attempted to be read by a host read command has been discarded when receiving the host read command from the host side 110 through the host I/F 131. If the user data attempted to read has been discarded, then the processing unit 134 replies to the host side with an error message or a dummy value through the host I/F 131. The processing unit 134 also consumes computation resources to search the discard queue for determining whether the logical addresses of user data attempted to be written by a host write command fall within any previously discarded logical address range when receiving the host write command from the host side 110 through the host I/F 131.

Although the specification describes the shortcomings of the above implementations, this is only used to illustrate the inspiration of embodiments of the present invention as follows. Those artisans can apply the technical solutions to solve other technical problems or be applicable to other technical environments, and the invention should not be limited thereto.

In order to reduce the workload of the processing unit to improve the overall performance of the flash controller 130, the flash controller 130 may allocate space in the RAM 136 for an expanded discard table and utilize the dedicated performance engine 137 to search the expanded discard table. The expanded discard table may include 1024 entries and each entry records a logical address of discarded user data or the NULL value. It is to be noted that those artisans may allocate more or less space in the RAM 136 to store the expanded discard table according to the requirements of the system, and the invention should not be limited to only 1024 entries in the expanded discard table. Table 2 shows an exemplary expanded discard table:

TABLE 2

| Entry# | Logical Address |
|---|---|
| 0 | P#100 |
| 1 | P#101 |
| . | . |
| . | . |
| . | . |
| 31 | P#131 |
| 32 | P#200 |
| 33 | P#201 |
| 34 | P#202 |
| 35 | P#203 |
| 36 | P#300 |
| 37 | P#301 |
| . | . |
| . | . |
| . | . |
| 99 | P#363 |
| 100 | P#500 |
| 101 | P#501 |
| . | . |
| . | . |
| . | . |
| 107 | P#507 |

Compared with Table 1, conceptually, the information of the $0^{th}$ entry in Table 1 can be expanded into the $0^{th}$ to the $31^{st}$ entries in Table 2, which respectively record the host page numbers P #100 to P #131; the information of the $1^{st}$ entry in Table 1 can be expanded into the $32^{nd}$ to $35^{th}$ entries in Table 2, which respectively record the host page numbers P #200 to P #203; and so on. The processing unit 134 performs sorting when appending entries to the expanded discard table according to the information carried in the host discard command, so that the logical addresses can be arranged in ascending or descending order, so as to facilitate the performance engine 137 to search.

Figure 3:
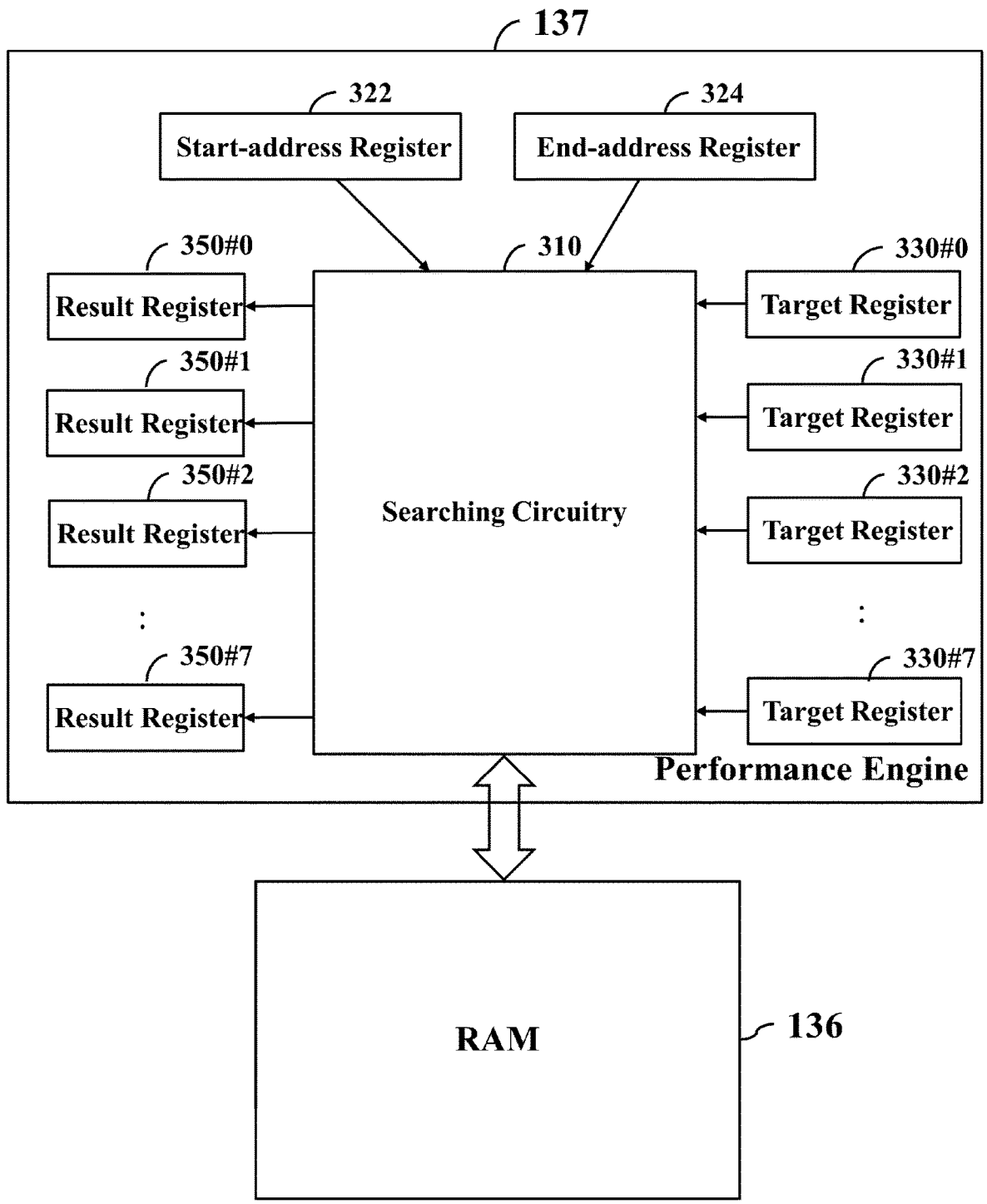
FIG. 3 is a block diagram showing a performance engine and a random access memory (RAM) according to an embodiment of the invention.

Refer to FIG. 3. The performance engine 137 may include the start-address register 322 and the end-address register 324 for enabling the processing unit 134 to define an address range of the expanded discard table in the RAM 136. Since the quantity of entries stored in the expanded discard table is variable, whenever the content of expanded discard table is updated, the processing unit 134 resets the start-address register 322 and the end-address register 324, which enables the searching circuitry 310 to conduct a search within the address range of RAM 136 specified by the start-address register 322 and the end-address register 324. For example, refer to the content of Table 2, the start-address register stores the memory address "ExpDiscardTable_start" and the end-address register stores the memory address "ExpDiscardTable_start"+107. The performance engine 137 may include eight target registers 330 #0 to 330 #7, which enables the processing unit 134 to instruct the searching circuitry 310 to search the expanded discard table for at most eight host page numbers. The performance engine 137 may include eight result registers 350 #0 to 350 #7, which enables the searching circuitry 310 to store the search results corresponding to the values stored in the target registers 330 #0 to 330 #7, respectively. For example, the result register 350 #0 stores the search result for the host page number that is indicated in the target register 330 #0, the result register 350 #1 stores the search result for the host page number that is indicated in the target register 330 #1, and so on. For example, the result register is a 16-bit register, in which the 15th bit stores information of whether it is a hit, and if it is a hit, the 14th to the 0th bits store the hit entry number in the expanded discard table. The processing unit 134 reads any value in the result registers 350 #0 to 350 #7 to obtain the information whether the host page number in the corresponding register appears in the expanded discard table, and, if it is hit, the processing unit 134 obtains which entry that this host page number exists in. It is to be noted that those artisans may configure more or less pairs of target register and result register in the performance engine 137 according to the requirements of the system, and the invention should not be limited to only eight pairs of target register and result register arranged in the performance engine 137. Those artisans may employ well-known circuits to realize the searching circuitry 310, which performs such as the linear search, the binary search, the exponential search, the Fibonacci search, etc.

In some embodiments, dedicated wire connections are used between the processing unit 134 and the performance engine 137 to allow the processing unit 134 to set the start-address register 322, the end-address register 324 and the target registers 330 #0 to 330 #7 and read the search results from the result registers 350 #0 to 350 #7.

In alternative embodiments, the shared bus architecture 132 is used between the processing unit 134 and the performance engine 137 to allow the processing unit 134 to set the start-address register 322, the end-address register 324 and the target registers 330 #0 to 330 #7 and read the search results from the result registers 350 #0 to 350 #7.

In some embodiments, dedicated wire connections are used between the performance engine 137 and the RAM 136 to allow the performance engine 137 to read a value from the designated address of the RAM 136.

In alternative embodiments, the shared bus architecture 132 is used between the performance engine 137 and the RAM 136 to allow the performance engine 137 to read a value from the designated address of the RAM 136.

Figure 4:
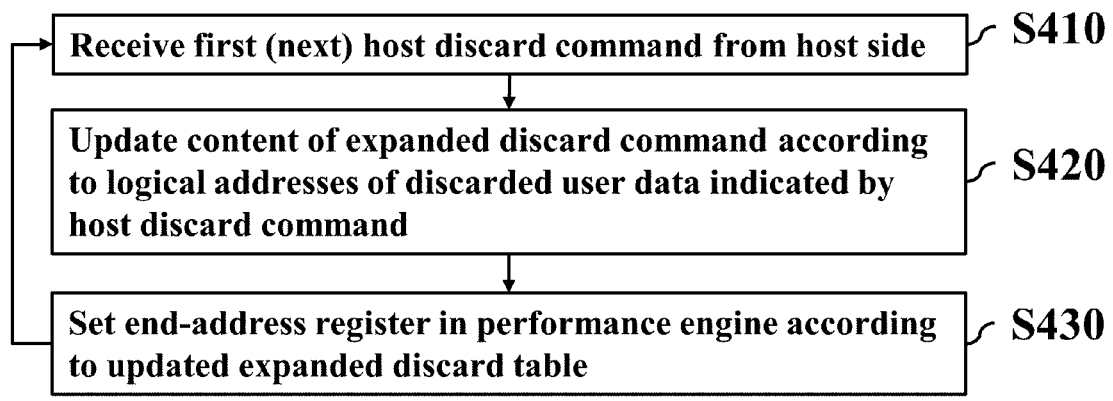
FIG. 4 is a flowchart illustrating a method for executing host discard commands according to an embodiment of the invention.

To conform to the technical solution incorporating with the expanded discard table and the performance engine 137, an embodiment of the invention introduces a method for executing a host discard command, which is performed by the processing unit 134 when loading and executing relevant firmware or software instructions. The process is repeatedly performed for executing host discard commands received from the host side 110. Refer to FIG. 4 showing detailed steps as follows:

Step S410: The first (next) host discard command is received from the host side 110 through the host I/F 131, which indicates the logical addresses of user data that is no longer used.

Step S420: The content of expanded discard table stored in the RAM 136 is updated according to the logical addresses of the discarded user data indicated by the host discard command. The entries of the updated expanded discard table are sorted in ascending or descending order according to their logical addresses.

Step S430: The end-address register 324 in the performance engine 137 is modified according to the updated expanded discard table.

Assume that before step S420 in a loop is executed, the expanded discard table is as shown in Table 2: When receiving an indication for discarding user data of the host pages P #400 to P #403 (step S410), the processing unit 134 updates the expanded discard table as shown in Table 2 with that as shown in Table 3 below (step S420):

TABLE 3

| Entry# | Logical Address |
| --- | --- |
| 0 | P#100 |
| 1 | P#101 |
| . | . |
| . | . |
| . | . |
| 31 | P#131 |
| 32 | P#200 |
| 33 | P#201 |
| 34 | P#202 |
| 35 | P#203 |
| 36 | P#300 |
| 37 | P#301 |
| . | . |
| . | . |
| . | . |
| 99 | P#363 |
| 100 | P#400 |
| 101 | P#401 |
| 102 | P#402 |
| 103 | P#403 |
| 104 | P#500 |
| 105 | P#501 |
| . | . |
| . | . |
| . | . |
| 111 | P#507 |

Subsequently, the processing unit 134 sets "ExpDiscardTable_start"+111 to the end-address register 324 (step S430).

Figure 5:
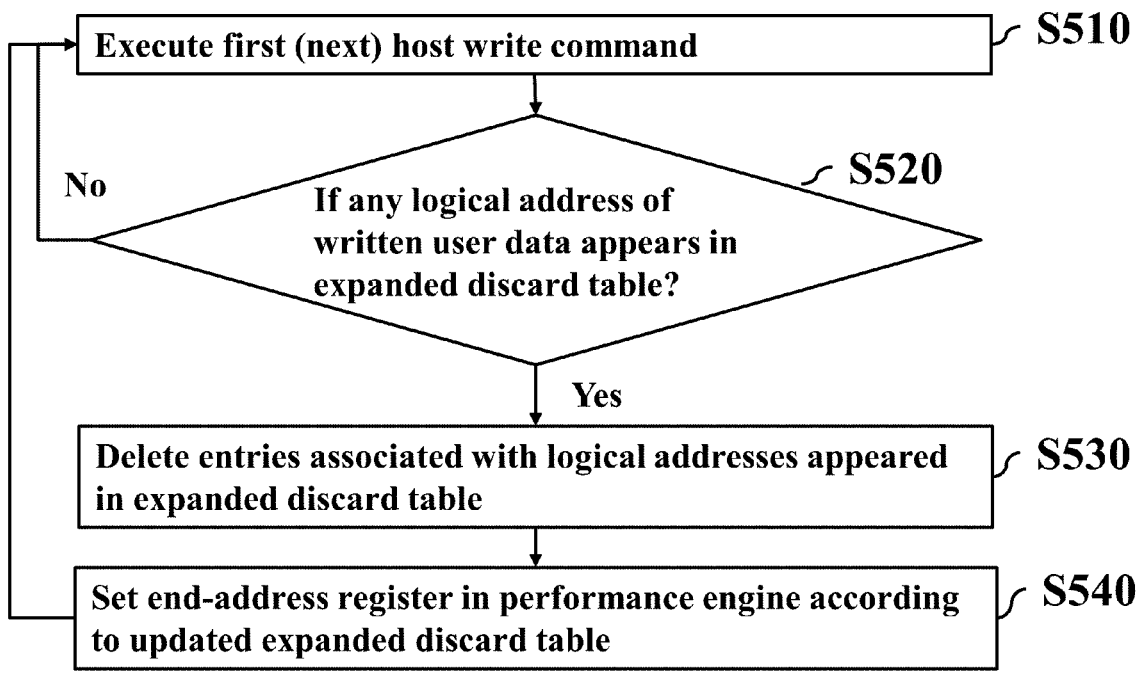
FIG. 5 is a flowchart illustrating a method for updating an expanded discard table after an execution for a host write command according to an embodiment of the invention.

To conform to the technical solution incorporating with the expanded discard table and the performance engine 137, an embodiment of the invention introduces a method for updating the expanded discard table after an execution of a host write command, which is performed by the processing unit 134 when loading and executing relevant firmware or software instructions. The process is repeatedly performed for adaptively updating the expanded discard table after each host write command is executed. Refer to FIG. 5 showing detailed steps as follows:

Step S510: The first (next) host write command is executed to program user data of the designated logical addresses into the flash module 150 through the flash I/F 139.

Step S520: It is determined whether the logical addresses appear in the expanded discard table. If so, the process proceeds to step S530; otherwise, the process proceeds to step S510. The processing unit 134 sets the logical addresses to the target registers 330 #0 to 330 #7 in the performance engine 137 and drives the performance engine 137 to search the expanded discard table for determining whether the logical addresses appear in the expanded discard table. It is to be noted that the processing unit 134 may turn to handle other tasks after setting the target registers 330 #0 to 330 #7 and driving the performance engine 137. After a predefined time period, the processing unit 134 checks the result registers 350 #0 to 350 #7 in the performance engine 137 for determining whether the logical addresses appear in the expanded discard table. The processing unit 134 proceeds to the next step until a completion of determinations for all logical addresses carried in the host write command.

Step S530: The entries associated with the logical addresses are deleted from the expanded discard table.

Step S540: The end-address register 324 in the performance engine 137 is modified according to the updated expanded discard table.

Assume that before step S510 in a loop is executed, the expanded discard table is as shown in Table 2: When completing the host write command for the user data of the host pages P #200 to P #203 (step S510), the processing unit 134 sets the logical address P #200 to P #203 to the target registers 330 #0 to 330 #3 in the performance engine 137 and drives the performance engine 137 to search the expanded discard table for determining whether the logical addresses appear in the expanded discard table (step S520). When detecting that the host pages P #200 to P #203 appear in the expanded discard table (the "Yes" path of step S520), the processing unit 134 updates the expanded discard table as shown in Table 2 with that as shown in Table 4 below (step S530):

TABLE 4

| Entry# | Logical Address |
|---|---|
| 0 | P#100 |
| 1 | P#101 |
| . | . |
| . | . |
| . | . |
| 31 | P#131 |
| 32 | P#300 |
| 33 | P#301 |
| . | . |
| . | . |
| . | . |
| 95 | P#363 |
| 96 | P#500 |
| 97 | P#501 |
| . | . |
| . | . |
| . | . |
| 103 | P#507 |

Subsequently, the processing unit 134 sets "ExpDiscard-Table_start"+103 to the end-address register 324 (step S540).

Figure 6:
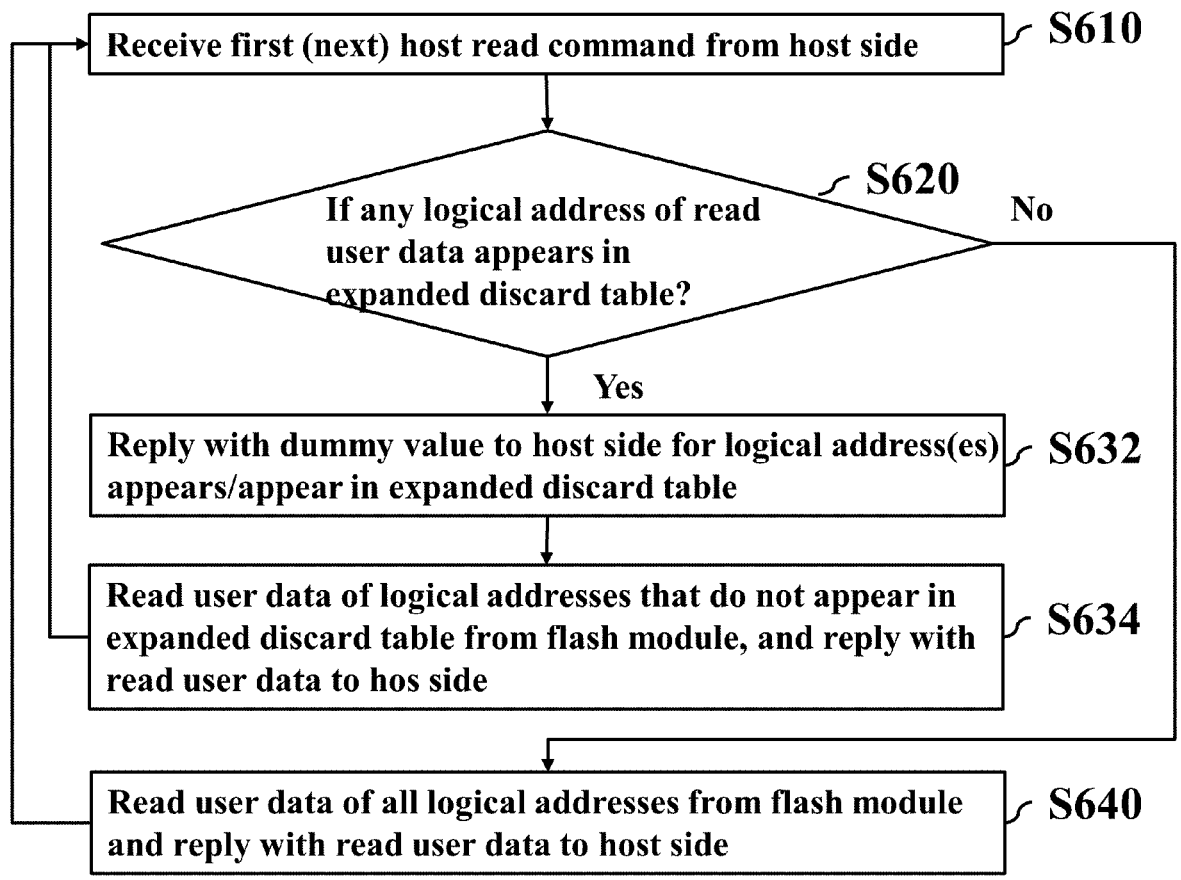
FIG. 6 is a flowchart illustrating a method for executing host discard commands according to an embodiment of the invention.

To conform to the technical solution incorporating with the expanded discard table and the performance engine 137, an embodiment of the invention introduces a method for executing a host read command, which is performed by the processing unit 134 when loading and executing relevant firmware or software instructions. The process is repeatedly performed for selectively replying dummy data or actual user data to the host side 110 according to the content of expanded discard table when each host read command is executed. Refer to FIG. 6 showing detailed steps as follows:

Step S610: The first (next) host read command for requesting the flash controller 130 to read user data of designated logical addresses is fetched.

Step S620: It is determined whether any logical address of the user data to be read appears in the expanded discard table. If so, the process proceeds to step S630; otherwise, the process proceeds to step S640. The processing unit 134 sets the logical addresses to the target registers 330 #0 to 330 #7 in the performance engine 137 and drives the performance engine 137 to search the expanded discard table for determining whether the logical addresses appear in the expanded discard table. It is to be noted that the processing unit 134 may turn to handle other tasks after setting the target registers 330 #0 to 330 #7 and driving the performance engine 137. After a predefined time period, the processing unit 134 checks the result registers 350 #0 to 350 #7 in the performance engine 137 for determining whether the logical addresses appear in the expanded discard table. The processing unit 134 proceeds to the next step until a completion of determinations for all logical addresses carried in the host read command.

Step S632: The host I/F 131 is driven to reply with the dummy value to the host side 110 for the logical address(es) appears/appear in the expanded discard table.

Step S634: The flash I/F 139 is driven to read user data of the logical addresses that do not appear in the expanded discard table from the flash module 150 and the host I/F 131 is driven to reply with the read user data to the host side 110.

Step S640: The flash I/F 139 is driven to read user data of the all designated logical addresses from the flash module 150 and the host I/F 131 is driven to reply with the read user data to the host side 110.

In some embodiments, the flash controller 130 may allocate space in the RAM 136 for the expanded discard table and the discard queue. If the length of logical addresses of the discarded user data indicated by a host discard command exceeds or equals a predefined number (for example, exceeds or equals 32), then the information carried in the discard command is stored in one node of the discard queue. For example, when the previously received four discard commands instruct to discard the user data of host pages P #100~P #131, P #200~P #203, P #300~P #363 and P #500~P #507, respectively, the information indicated by the four discard commands are recorded in the discard queue as shown in Table 5 and the expanded discard table as shown in Table 6 as follows:

TABLE 5

| Node# | Start Address | Length |
|---|---|---|
| 0 | P#100 | 32 |
| 1 | P#300 | 64 |

TABLE 6

| Entry# | Logical Address |
|---|---|
| 0 | P#200 |
| 1 | P#201 |
| 2 | P#202 |
| 3 | P#203 |
| 4 | P#500 |
| 5 | P#501 |
| . | . |
| . | . |
| . | . |
| 11 | P#507 |

Figure 7:
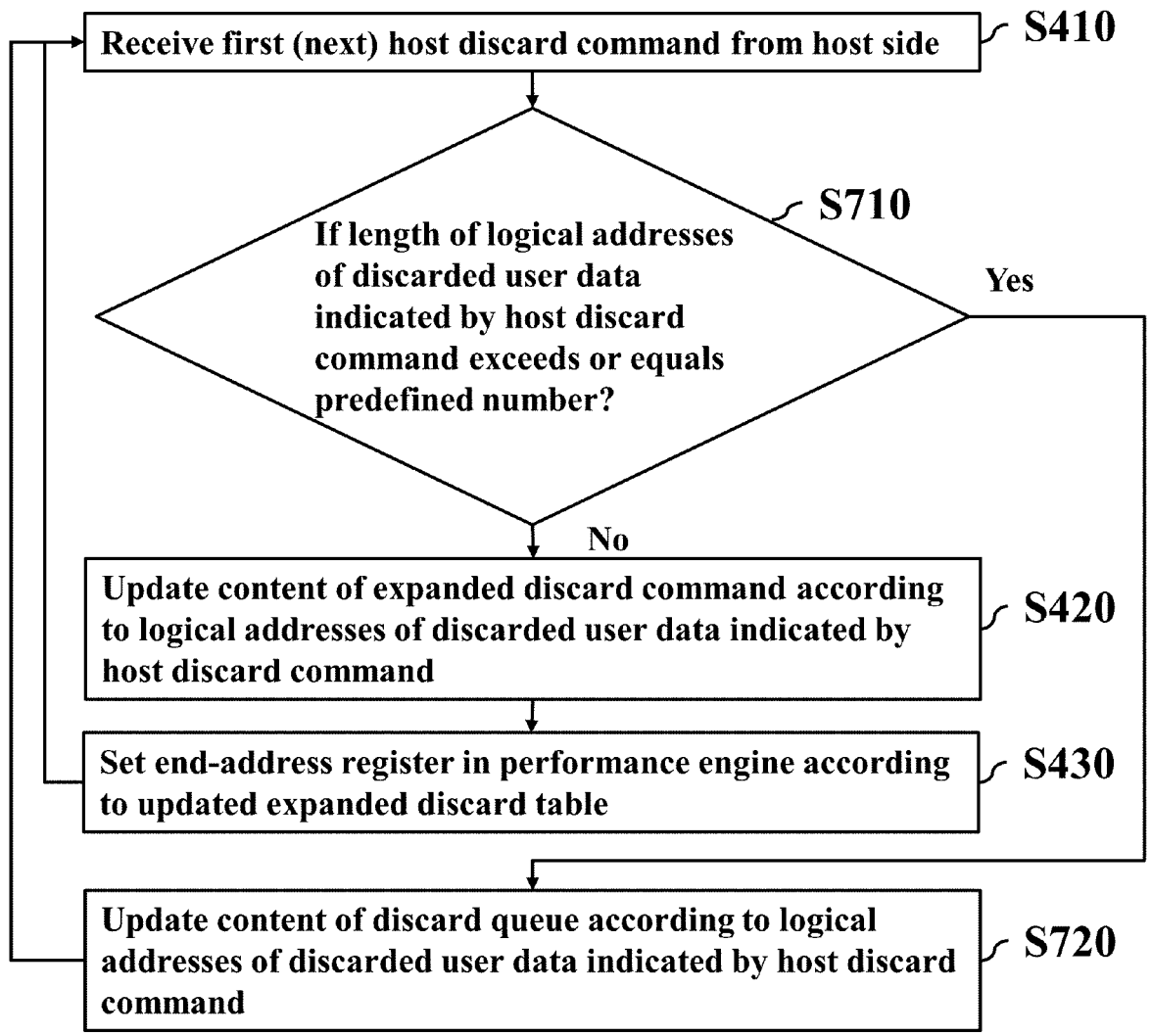
FIG. 7 is a flowchart illustrating a method for executing host discard commands according to an embodiment of the invention.

To conform to the technical solution incorporating with the discard queue, the expanded discard table and the performance engine 137, an embodiment of the invention introduces a method for executing a host discard command, which is performed by the processing unit 134 when loading and executing relevant firmware or software instructions. The process is repeatedly performed for executing host discard commands received from the host side 110. Refer to FIG. 7. The differences between FIG. 7 and FIG. 4 are that the determination step S710 is inserted after step S410 and step S720 is added when the determination is positive. Detailed description is as follows:

Step S710: It is determined whether the length of logical addresses of the discarded user data indicated by a host discard command exceeds or equals a predefined number (for example, 32). If so, the process proceeds to step S720; otherwise, the process proceeds to step S420.

Step S720: The content of discard queue in the RAM 136 is updated according to the logical addresses of the discarded user data indicated by the host discard command.

The technical details of steps S410 to S430 in FIG. 7 may refer to the corresponding description in FIG. 4, and will not repeated for brevity.

Figure 8:
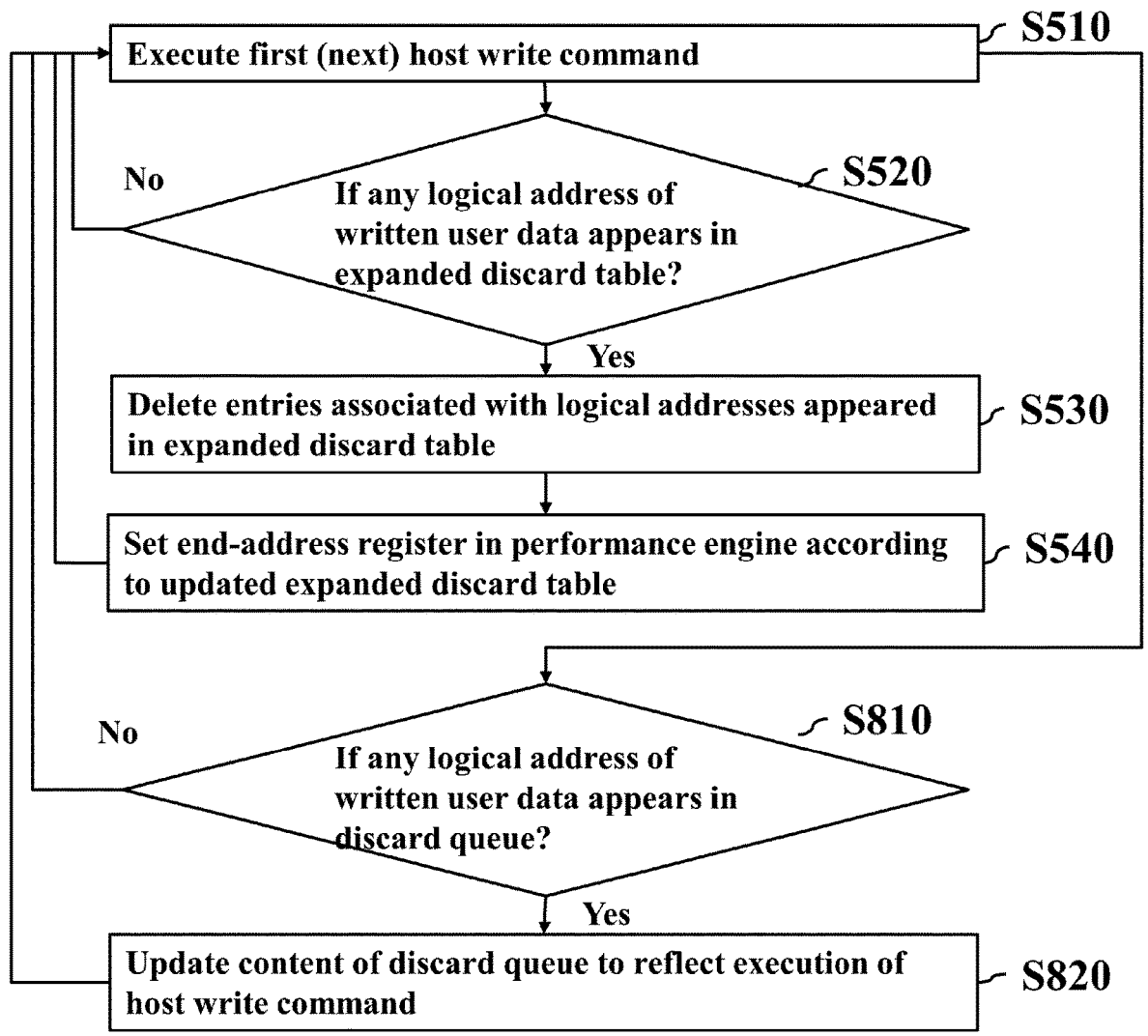
FIG. 8 is a flowchart illustrating a method for updating an expanded discard table and a discard queue after an execution for a host write command according to an embodiment of the invention.

To conform to the technical solution incorporating with the discard queue, the expanded discard table and the performance engine 137, an embodiment of the invention introduces a method for updating the expanded discard table after an execution of a host write command, which is performed by the processing unit 134 when loading and executing relevant firmware or software instructions. The process is repeatedly performed for adaptively updating the discard queue and the expanded discard table after each host write command is executed. Refer to FIG. 8. The differences between FIG. 8 and FIG. 5 are that the determination step S810 is inserted after step S510 and step S820 is added when the determination is positive. Detailed description is as follows:

Step S810: It is determined whether any logical address of the written user data appears in the discard queue. If so, the process proceeds to step S820; otherwise, the process proceeds to step S510.

Step S820: The content of discard queue is updated to reflect the execution of the host write command. Assume that before step S510 in a loop is executed, the discard queue is as shown in Table 5: After executing the host write command for the user data of the host pages P #100 to P #131 (step S510), the processing unit 134 deletes the 0th node from the discard queue to become that as shown in Table 7 (step S820).

TABLE 7

| Node# | Start Address | Length |
|---|---|---|
| 0 | P#300 | 64 |

The technical details of steps S510, S530 to S540 in FIG. 8 may refer to the corresponding description in FIG. 5, and will not repeated for brevity. It is to be noted that steps S520 to S540 and steps S810 to S820 can be performed in parallel with the aid of the performance engine 137.

Figure 9:
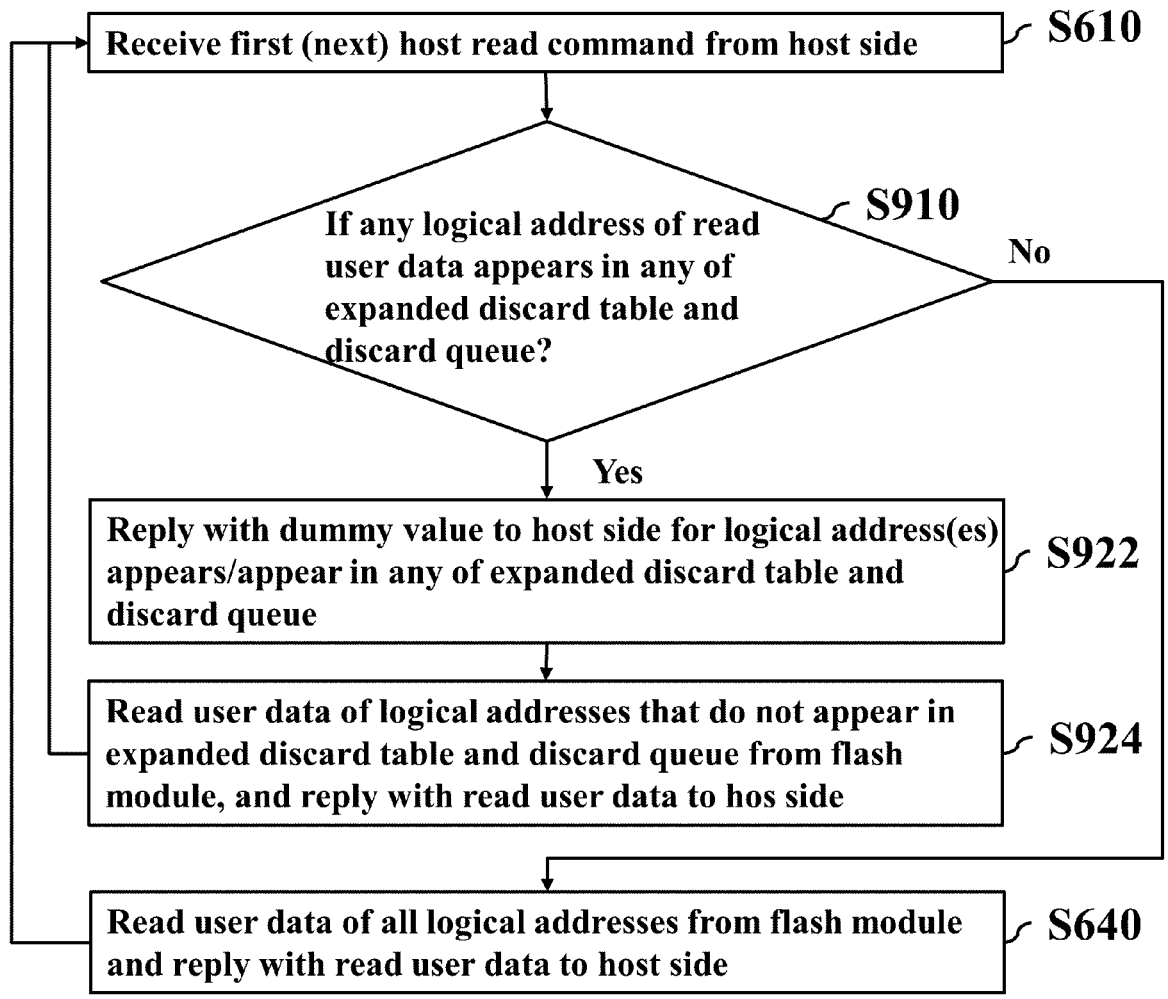
FIG. 9 is a flowchart illustrating a method for executing host discard commands according to an embodiment of the invention.

To conform to technical solution incorporating with the discard queue, the expanded discard table and the performance engine 137, an embodiment of the invention introduces a method for executing a host read command, which is performed by the processing unit 134 when loading and executing relevant firmware or software instructions. The process is repeatedly performed for selectively replying dummy data or actual user data to the host side 110 according to the content of discard queue and expanded discard table when each host read command is executed. Refer to FIG. 9. The differences between FIG. 9 and FIG. 6 are that steps S910, S922 and S924 are provided to replace steps S620, S632 and S634. Detailed description is as follows:

Step S910: It is determined whether any logical address of the user data to be read appears in any of the expanded discard table and the discard queue. If so, the process proceeds to step S922; otherwise, the process proceeds to step S640. The processing unit 134 sets the logical addresses to the target registers 330 #0 to 330 #7 in the performance engine 137 and drives the performance engine 137 to search the expanded discard table for determining whether the logical addresses appear in the expanded discard table. It is to be noted that the processing unit 134 searches the discard queue for determining whether the logical addresses appear in the discard queue after setting the target registers 330 #0 to 330 #7 and driving the performance engine 137. After a predefined time period, the processing unit 134 checks the result registers 350 #0 to 350 #7 in the performance engine 137 for determining whether the logical addresses appear in the expanded discard table. The processing unit 134 proceeds to the next step until a completion of determinations for all logical addresses carried in the host read command.

Step S922: The host I/F 131 is driven to reply with the dummy value to the host side 110 for the logical address(es) appears/appear in any of the expanded discard table and the discard queue.

Step S924: The flash I/F 139 is driven to read user data of the logical addresses that do not appear in the expanded discard table and the discard queue from the flash module 150 and the host I/F 131 is driven to reply with the read user data to the host side 110.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

Although the embodiment has been described as having specific elements in FIGS. 1 to 3, it should be noted that additional elements may be included to achieve better performance without departing from the spirit of the invention. Each element of FIGS. 1 to 3 is composed of various circuitries and arranged operably to perform the aforementioned operations. While the process flows described in FIGS. 4 to 9 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for data access in response to a host discard command, performed by a processing unit, comprising:
    allocating space in a random access memory (RAM) for an expanded discard table, wherein the expanded discard table comprises a plurality of entries and each entry records one logical address of discarded user data;
    receiving a first host discard command from a host side, wherein the first host discard command indicates first logical addresses of user data that is no longer used;
    appending first new entries each comprising one first logical address to the expanded discard table; and
    setting a start-address register and/or an end-address register in a performance engine for redefining an address range in the RAM that stores the expanded discard table, thereby enabling the performance engine to search the expanded discard table in the address range in the RAM for determining whether a specific logical address of user data is no longer used.

2. The method of claim 1, wherein the entries of the expanded discard table are arranged in ascending or descending order.

3. The method of claim 1, comprising:
    executing a host write command to program a second logical address of user data into a flash module; and
    deleting an entry comprising the second logical address from the expanded discard table, and setting the end-address register in the performance engine according to content of updated expanded discard table for redefining the address range in the RAM storing the expanded discard table when the second logical address appears in the expanded discard table.

4. The method of claim 1, comprising:
    receiving a host read command from a host side, wherein the host read command requests to read a third logical address of user data; and
    replying with dummy data to the host side when the third logical address appears in the expanded discard table.

5. The method of claim 1, comprising:
    allocating space in the RAM for a discard queue, wherein the discard queue comprises a plurality of nodes and each node stores a logical address range of discarded user data;
    receiving a second host discard command from a host side, wherein the second host discard command indicates fourth logical addresses of user data that is no longer used;
    determining whether a length of the fourth logical addresses exceeds or equals a predefined number;
    appending second new entries each comprising one fourth logical address to the expanded discard table, and setting the start-address register and the end-address register in the performance engine for redefining the address range in the RAM storing the expanded discard table when the length of the fourth logical addresses exceeds or equals the predefined number; and
    appending a new node comprising the fourth logical addresses to the discard queue when the length of the fourth logical addresses is lower than the predefined number.

6. The method of claim 5, comprising:
    executing a host write command issued by the host side, wherein the host write command requests to program a fifth logical address of user data into a flash module;
    deleting an entry corresponding to the fifth address from the expanded discard table and setting the end-address register in the performance engine for defining a new address range in the RAM storing the expanded discard table according to content of updated expanded discard table when the fifth logical address appears in the expanded discard table; and
    updating content of the discard queue to reflect an execution of the host write command when the fourth logical address appears in the discard queue.

7. The method of claim 5, comprising:
    receiving a host read command from the host side, wherein the host read command requests to read user data of a sixth logical address; and
    replying with dummy data to the host side when the sixth logical address appears in the expanded discard table or the discard queue.

8. A non-transitory computer-readable storage medium having stored therein program code that, when loaded and executed by a processing unit, causes the processing unit to:
    allocate space in a random access memory (RAM) for an expanded discard table, wherein the expanded discard table comprises a plurality of entries and each entry records one logical address of discarded user data;
    receive a host discard command from a host side, wherein the host discard command indicates first logical addresses of user data that is no longer used;
    append first new entries each comprising one first logical address to the expanded discard table; and
    set a start-address register and/or an end-address register in a performance engine for redefining an address range in the RAM that stores the expanded discard table, thereby enabling the performance engine to search the expanded discard table in the address range in the RAM for determining whether a specific logical address of user data is no longer used.

9. The non-transitory computer-readable storage medium of claim 8, wherein the program code that, when loaded and executed by the processing unit, causes the processing unit to:
    execute a host write command to program a second logical address of user data into a flash module; and
    delete an entry comprising the second logical address from the expanded discard table, and set the end-address register in the performance engine according to content of updated expanded discard table for redefining the address range in the RAM storing the expanded discard table when the second logical address appears in the expanded discard table.

10. The non-transitory computer-readable storage medium of claim 8, wherein the program code that, when loaded and executed by the processing unit, causes the processing unit to:
  receive a host read command from the host side, wherein the host read command requests to read a third logical address of user data; and
  reply with dummy data to the host side when the third logical address appears in the expanded discard table.

11. The non-transitory computer-readable storage medium of claim 8, wherein the program code that, when loaded and executed by the processing unit, causes the processing unit to:
  allocate space in the RAM for a discard queue, wherein the discard queue comprises a plurality of nodes and each node stores a logical address range of discarded user data;
  receive a second host discard command from the host side, wherein the second host discard command indicates fourth logical addresses of user data that is no longer used;
  determine whether a length of the fourth logical addresses exceeds or equals a predefined number;
  append second new entries each comprising one fourth logical address to the expanded discard table, and set the start-address register and the end-address register in the performance engine for redefining the address range in the RAM storing the expanded discard table when the length of the fourth logical addresses exceeds or equals the predefined number; and
  append a new node comprising the fourth logical addresses to the discard queue when the length of the fourth logical addresses is lower than the predefined number.

12. The non-transitory computer-readable storage medium of claim 11, wherein the program code that, when loaded and executed by the processing unit, causes the processing unit to:
  execute a host write command issued by the host side, wherein the host write command requests to program a fifth logical address of user data into a flash module;
  delete an entry corresponding to the fifth address from the expanded discard table and set the end-address register in the performance engine for defining a new address range in the RAM storing the expanded discard table according to content of updated expanded discard table when the fifth logical address appears in the expanded discard table; and
  update content of the discard queue to reflect an execution of the host write command when the fourth logical address appears in the discard queue.

13. The non-transitory computer-readable storage medium of claim 11, wherein the program code that, when loaded and executed by the processing unit, causes the processing unit to:
  receive a host read command from the host side, wherein the host read command requests to read user data of a sixth logical address; and
  reply with dummy data to the host side when the sixth logical address appears in the expanded discard table or the discard queue.

14. An apparatus for data access in response to a host discard command, comprising:
  a random access memory (RAM), arranged operably to allocate space for an expanded discard table, wherein the expanded discard table comprises a plurality of entries and each entry records one logical address of discarded user data;
  a performance engine, comprising a start-address register and an end-address register for defining an address rang in the RAM storing the expanded discard table; and
  a processing unit, coupled to the RAM and the performance engine, arranged operably to: receive a first host discard command from a host side, wherein the first host discard command indicates first logical addresses of user data that is no longer used; append first new entries each comprising one first logical address to the expanded discard table; and set the start-address register and/or the end-address register in the performance engine for redefining the address range in the RAM that stores the expanded discard table, thereby enabling the performance engine to search the expanded discard table in the address range in the RAM for determining whether a specific logical address of user data is no longer used.

15. The apparatus of claim 14, wherein the entries of the expanded discard table are arranged in ascending or descending order.

16. The apparatus of claim 14, wherein the processing unit is arranged operably to: execute a host write command to program a second logical address of user data into a flash module; and delete an entry comprising the second logical address from the expanded discard table, and set the end-address register in the performance engine according to content of updated expanded discard table for redefining the address range in the RAM storing the expanded discard table when the second logical address appears in the expanded discard table.

17. The apparatus of claim 14, wherein the processing unit is arranged operably to: receive a host read command from the host side, wherein the host read command requests to read a third logical address of user data; and reply with dummy data to the host side when the third logical address appears in the expanded discard table.

18. The apparatus of claim 14,
  wherein the RAM is arranged operably to allocate space for a discard queue, wherein the discard queue comprises a plurality of nodes and each node stores a logical address range of discarded user data,
  wherein the processing unit is arranged operably to: receive a second host discard command from the host side, wherein the second host discard command indicates fourth logical addresses of user data that is no longer used; determine whether a length of the fourth logical addresses exceeds or equals a predefined number; append second new entries each comprising one fourth logical address to the expanded discard table, and set the start-address register and the end-address register in the performance engine for redefining the address range in the RAM storing the expanded discard table when the length of the fourth logical addresses exceeds or equals the predefined number; and append a new node comprising the fourth logical addresses to the discard queue when the length of the fourth logical addresses is lower than the predefined number.

19. The apparatus of claim 18, wherein the processing unit is arranged operably to: execute a host write command issued by the host side, wherein the host write command requests to program a fifth logical address of user data into a flash module; delete an entry corresponding to the fifth address from the expanded discard table and set the end-address register in the performance engine for defining a new address range in the RAM storing the expanded discard table according to content of updated expanded discard table when the fifth logical address appears in the expanded discard table; and update content of the discard queue to reflect an execution of the host write command when the fourth logical address appears in the discard queue.

20. The apparatus of claim 18, wherein the processing unit is arranged operably to: receive a host read command from the host side, wherein the host read command requests to read user data of a sixth logical address; and reply with dummy data to the host side when the sixth logical address appears in the expanded discard table or the discard queue.

* * * * *